United States Patent
Lim et al.

(10) Patent No.: US 12,418,028 B2
(45) Date of Patent: *Sep. 16, 2025

(54) IRREVERSIBLE ADDITIVE COMPRISED IN CATHODE MATERIAL FOR SECONDARY BATTERY, CATHODE MATERIAL COMPRISING THE SAME, AND SECONDARY BATTERY COMPRISING CATHODE MATERIAL

(71) Applicant: LG Energy Solution, Ltd., Seoul (KR)

(72) Inventors: Sung Chul Lim, Daejeon (KR); Minchul Jang, Daejeon (KR); Kyoung Hoon Kim, Daejeon (KR); Youngcheol Choi, Daejeon (KR); Insung Uhm, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 693 days.

This patent is subject to a terminal disclaimer.

(21) Appl. No.: 17/785,278

(22) PCT Filed: Jan. 19, 2021

(86) PCT No.: PCT/KR2021/000748
§ 371 (c)(1),
(2) Date: Jun. 14, 2022

(87) PCT Pub. No.: WO2021/153937
PCT Pub. Date: Aug. 5, 2021

(65) Prior Publication Data
US 2023/0006207 A1 Jan. 5, 2023

(30) Foreign Application Priority Data

Jan. 31, 2020 (KR) .................. 10-2020-0012225
Jan. 13, 2021 (KR) .................. 10-2021-0004696

(51) Int. Cl.
*H01M 4/62* (2006.01)
*C01G 53/42* (2025.01)
(Continued)

(52) U.S. Cl.
CPC .............. *H01M 4/62* (2013.01); *C01G 53/42* (2013.01); *H01M 4/131* (2013.01); *H01M 4/505* (2013.01);
(Continued)

(58) Field of Classification Search
CPC ........ H01M 4/62; H01M 4/131; H01M 4/505; H01M 4/525; H01M 10/0525; H01M 2004/028
See application file for complete search history.

(56) References Cited

U.S. PATENT DOCUMENTS

2002/0094481 A1 7/2002 Goto et al.
2004/0023117 A1 2/2004 Imachi et al.
(Continued)

FOREIGN PATENT DOCUMENTS

CN 1349273 A 5/2002
CN 1745490 A 3/2006
(Continued)

OTHER PUBLICATIONS

Davidson, I,; Greedan, J.E.,; U. von Sacken, C.A. Michael; Dahn, J.R.; Structure of 1T—Li2NiO2 from powder neutron diffraction; 1991, Solid State Ionics 46, 243-247 (Year: 1991).*

(Continued)

*Primary Examiner* — Niki Bakhtiari
*Assistant Examiner* — Ryan Blackwell-Rudasill
(74) *Attorney, Agent, or Firm* — Lerner David LLP

(57) ABSTRACT

The present disclosure provides an irreversible additive contained in a cathode material for a secondary battery, wherein the irreversible additive is an oxide represented by (Continued)

the following chemical Formula 1, and wherein the oxide has a trigonal structure, a cathode material including the irreversible additive, and a secondary battery including the cathode material:

$$Li_{2+a}Ni_{1-b}Mo_bO_{2+c} \tag{1}$$

in Formula 1, $-0.25 \leq a \leq 0.2$, $0 < b \leq 0.2$, $0 \leq c \leq 0.2$.

11 Claims, 3 Drawing Sheets

(51) Int. Cl.
  H01M 4/02 (2006.01)
  H01M 4/131 (2010.01)
  H01M 4/505 (2010.01)
  H01M 4/525 (2010.01)
  H01M 10/0525 (2010.01)

(52) U.S. Cl.
  CPC ....... *H01M 4/525* (2013.01); *H01M 10/0525* (2013.01); *C01P 2002/76* (2013.01); *H01M 2004/028* (2013.01); *Y02E 60/10* (2013.01)

(56) References Cited

U.S. PATENT DOCUMENTS

| | | |
|---|---|---|
| 2004/0157124 A1 | 8/2004 | Goh et al. |
| 2005/0118496 A1 | 6/2005 | Chang et al. |
| 2006/0257737 A1 | 11/2006 | Goh et al. |
| 2007/0015055 A1 | 1/2007 | Lee et al. |
| 2007/0259271 A1 | 11/2007 | Nanno et al. |
| 2010/0203386 A1* | 8/2010 | Chang ............... H01M 4/364 429/231.95 |
| 2012/0021284 A1 | 1/2012 | Lee et al. |
| 2013/0011727 A1 | 1/2013 | Chang et al. |
| 2013/0188294 A1 | 7/2013 | Kim et al. |
| 2014/0099549 A1 | 4/2014 | Ceder et al. |
| 2014/0141329 A1 | 5/2014 | Ceder et al. |
| 2014/0315078 A1 | 10/2014 | Chang et al. |
| 2018/0053934 A1 | 2/2018 | Ceder et al. |
| 2020/0161651 A1 | 5/2020 | Sun et al. |
| 2023/0307615 A1 | 9/2023 | Moon et al. |

FOREIGN PATENT DOCUMENTS

| | | |
|---|---|---|
| CN | 102339980 A | 2/2012 |
| CN | 208799783 U | 4/2019 |
| CN | 110556520 A | 12/2019 |
| EP | 1665420 A2 | 6/2006 |
| EP | 2270901 A1 | 1/2011 |
| JP | 2004063394 A | 2/2004 |
| JP | 2006512747 A | 4/2006 |
| JP | 2006514776 A | 5/2006 |
| JP | 2008547156 A | 12/2008 |
| JP | 5451228 B2 | 3/2014 |
| JP | 2019117781 A | 7/2019 |
| KR | 20040088292 A | 10/2004 |
| KR | 20050030588 A | 3/2005 |
| KR | 100612089 B1 | 8/2006 |
| KR | 20070069200 A | 7/2007 |
| KR | 20070098163 A | 10/2007 |
| KR | 20120035131 A | 4/2012 |
| KR | 101244737 B1 | 3/2013 |
| KR | 20150065840 A | 6/2015 |
| KR | 20180115644 A | 10/2018 |

OTHER PUBLICATIONS

H. Park et al., "Li2NiO2 as a Sacrificing Positive Additive for Lithium-Ion Batteries", Electrochimica Acta 108 (2013), pp. 591-595 (Year: 2013).*

I. Davidson, et al., Structure of 1T—Li2NiO2 from powder neutron diffraction, Solid State Ionics, vol. 46, Dec. 1991, pp. 243-247.

Search Report dated May 8, 24 from Office Action for Chinese Application No. 202180004659.2 issued May 9, 2024 2 pgs.

Kang, Kisuk, et al., "Synthesis, Electrochemical Properties, and Phase Stability of Li2NiO2 with the Immm Structure", Chemistry of Materials, 16. (Jun. 2004) pp. 2685-2690.

Lee, Hochun, et al., "Li 2 NiO 2 as a Novel Cathode Additive for Overdischarge Protection of Li-Ion Batteries", Chemistry of Materials—Chem Mater. 20. (Jan. 2008). 4 pages.

Cheng-Gong Han, et al., "Enhanced cycling performance of surface-doped LiMn2O4 modified by a Li2CuO2—Li2NiO2 solid solution for rechargeable lithium-ion batteries", Electrochimica Acta, vol. 224, (Jan. 2017), 71-79. 42 pgs. ISSN 0013-4686, https://doi.org/10.1016/j.electacta.2016.12.041.

Davidson, I. J., et al., "Short Range and Long Range Magnetic Order in 1 T—Li 2NiO 2", Journal of Solid State Chemistry, vol. 105, Issue 2, (Aug. 1993) pp. 410-416.

Ruther, Rose E., et al., "Structural Transformations in High-Capacity Li2Cu0.5Ni0.5O2 Cathodes" Chemistry of Materials, (Mar. 2017) 29 (7), 2997-3005. DOI: 10.1021/acs.chemmater.6b05442. 21 pgs.

N. Imanishi, Y., et al., "Antifluorite compounds, Li5+xFe1-xCoxO4, as a lithium intercalation host," Journal of Power Sources, vol. 146, Issues 1-2, (Aug. 2005), pp. 21-26.

Park, M.-S., et al., "Scalable Integration of Li5FeO4 towards Robust, High-Performance Lithium-Ion Hybrid Capacitors". ChemSusChem, 7: (Sep. 2014), pp. 3138-3144.

Ohzuku, Tsutomu et al. "Electrochemistry and Structural Chemistry of LiNiO2 (R3¯m) for 4 Volt Secondary Lithium Cells." Journal of The Electrochemical Society 140 (Jul. 1993): pp. 1862-1870.

G Vitins, et al., "Li2CuO2 as an Additive in Positive Electrodes of Lithium Cells", Dept. of Chemistry, University of Southampton, 1 pg. [Retreived from Internet on Jun. 17, 22] <https://www.electrochem.org/dl/ma/201/pdfs/0108.pdf>.

International Search Report for PCT/KR2021/000748 dated May 4, 2021. 3 pgs.

* cited by examiner

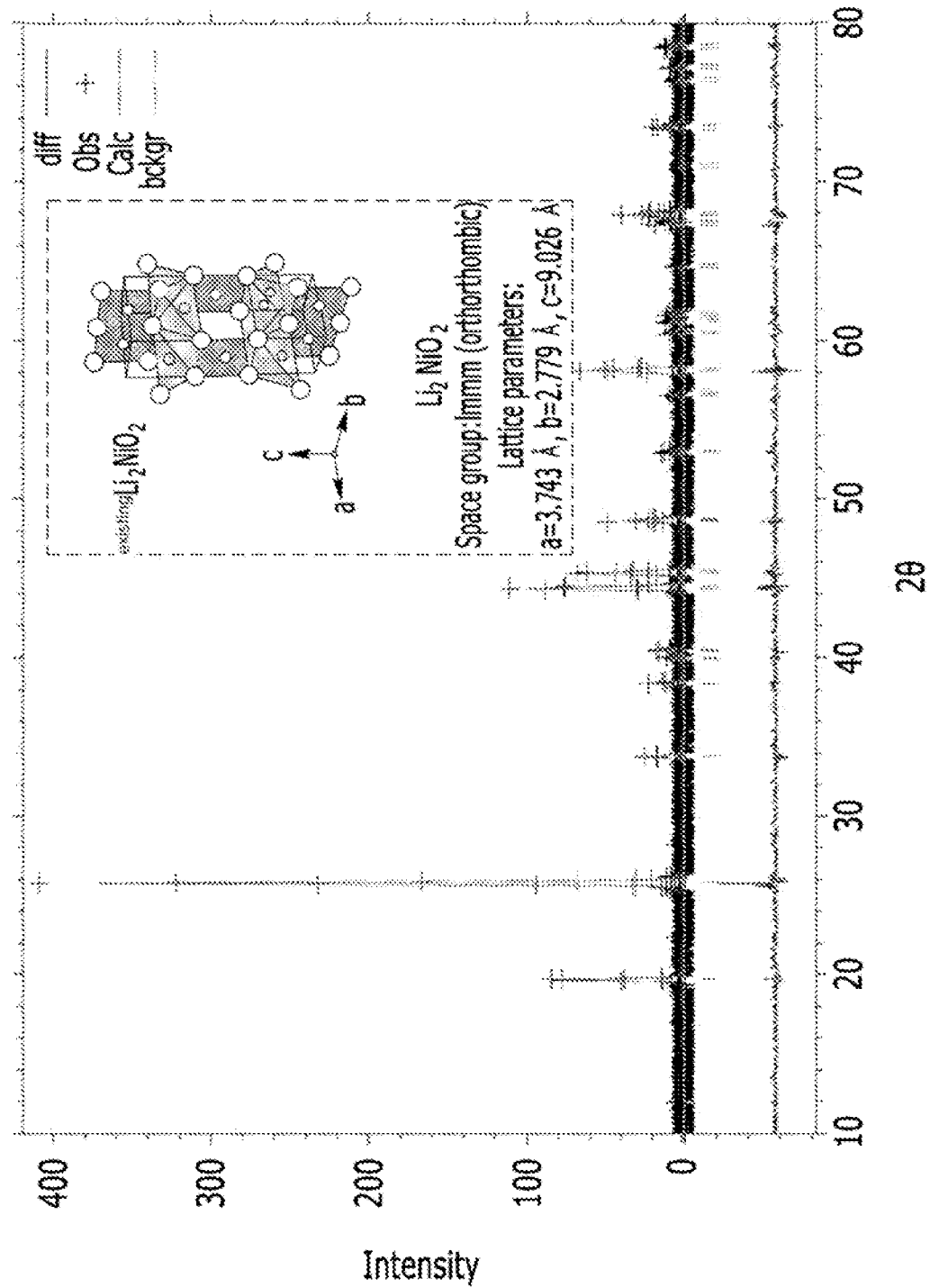
[FIG. 1]

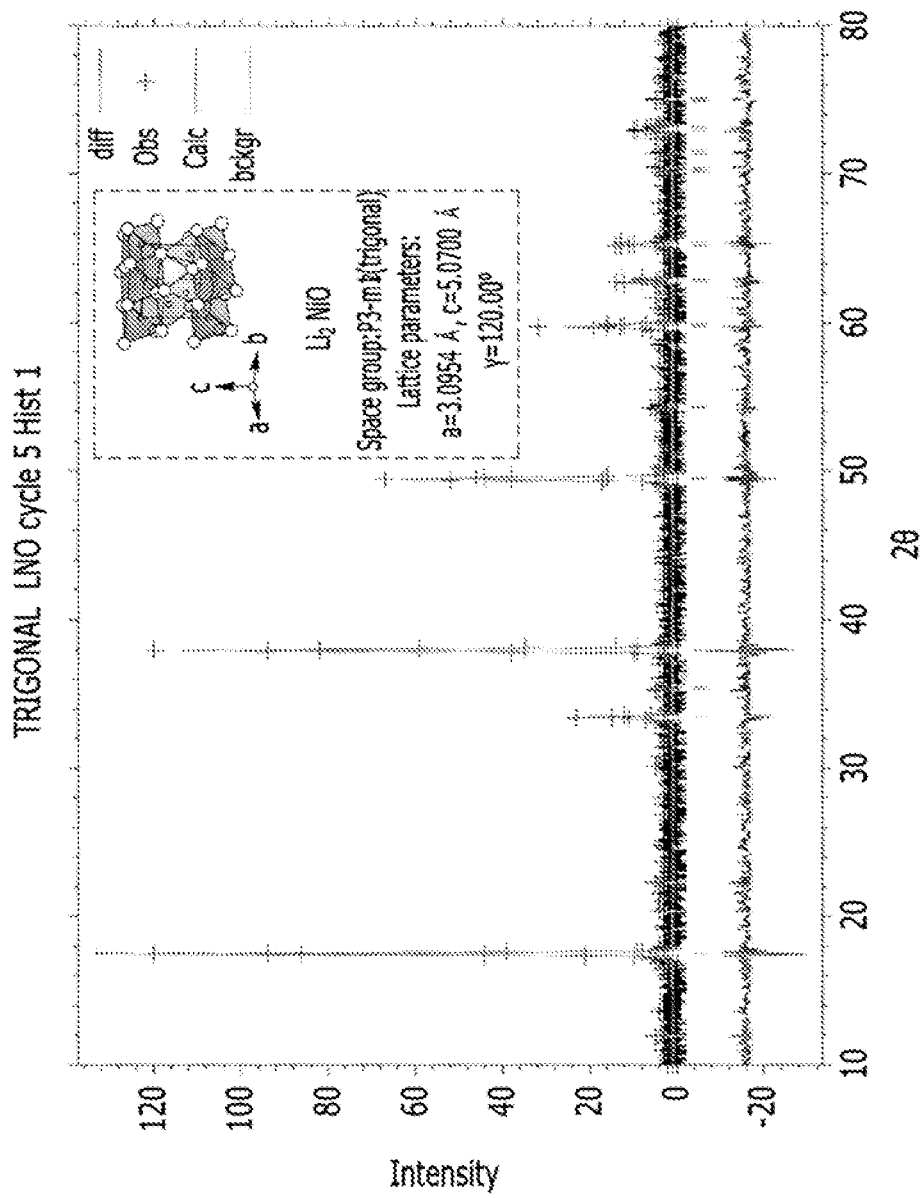
[FIG. 2]

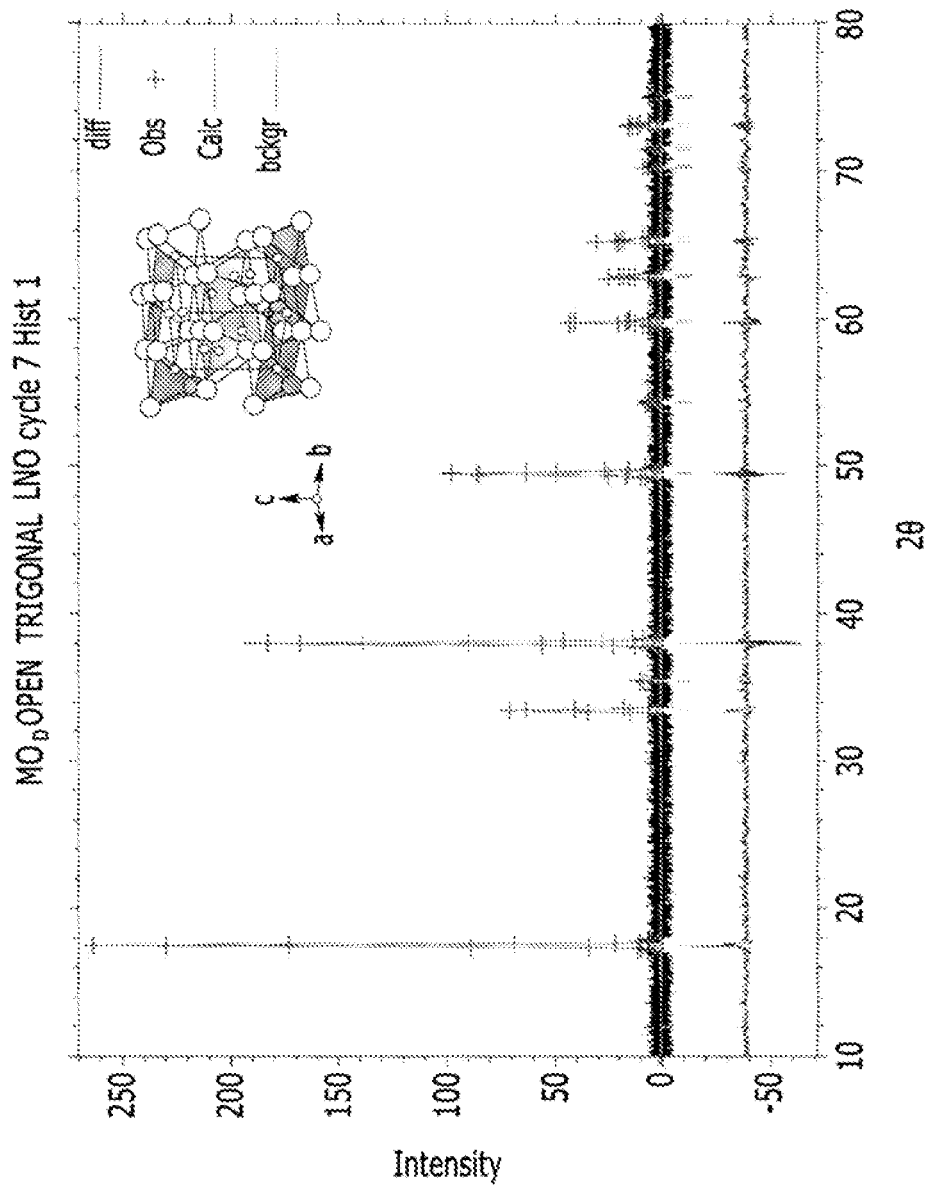
[FIG. 3]

IRREVERSIBLE ADDITIVE COMPRISED IN CATHODE MATERIAL FOR SECONDARY BATTERY, CATHODE MATERIAL COMPRISING THE SAME, AND SECONDARY BATTERY COMPRISING CATHODE MATERIAL

CROSS-REFERENCE TO RELATED APPLICATION

The present application is a national phase entry under 35 U.S.C. § 371 of International Application No. PCT/KR2021/000748, filed Jan. 19, 2021, which claims priority from Korean Patent Application No. 10-2020-0012225 filed on Jan. 31, 2020 and Korean Patent Application No. 10-2021-0004696 filed on Jan. 13, 2021 in the Korean Intellectual Property Office, all of which are incorporated herein by reference.

TECHNICAL FIELD

The present disclosure relates to an irreversible additive contained in a cathode material for a secondary battery that minimizes generation of impurities or gas and has excellent structural stability, a cathode material including the same, and a secondary battery including the cathode material.

BACKGROUND ART

Due to the rapid increase in the use of fossil fuels, the demand for the use of alternative energy or clean energy is increasing, and as part thereof, the fields that are being studied most actively are the fields of power generation and power storage using electrochemistry.

Currently, a secondary battery is a representative example of an electrochemical device that utilizes such electrochemical energy, and the range of use thereof tends to be gradually expanding.

Recently, as the technological development and demand for mobile devices such as portable computers, portable phones, and cameras increase, the demand for secondary batteries as an energy source rapidly increases. Among such secondary batteries, many studies have been conducted on a lithium secondary battery that exhibits high energy density and operating potential, have a long cycle life, and a low self-discharge rate, and also has been commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution.

Although a nickel metal hydride secondary battery is mainly used as a power source for the electric vehicle and the hybrid electric vehicle, research on the use of a lithium secondary battery having high energy density and discharge voltage is actively being conducted, a part of which are in a commercializing stage.

Carbon materials are mainly used as an anode active material of such lithium secondary battery, and lithium transition metal composite oxide is used as a cathode active material of lithium the secondary battery. Among them, in addition to lithium cobalt composite metal oxides such as $LiCoO_2$ having high operating voltage and excellent capacity characteristics, various lithium transition metal oxides such as $LiNiO_2$, $LiMnO_2$, $LiMn_2O_4$ or $LiFePO_4$ have been developed.

Meanwhile, due to the consumption of Li ions at the time of the initial charge/discharge, the formation of a solid electrolyte interphase (SEI) layer and the irreversibility of cathode and anode ions can occur.

Consequently, the energy density is reduced, and there is a problem that the theoretical amount that can be designed cannot be sufficiently used.

In order to solve these problems, an irreversible additive was added to the cathode material to supplement lithium ions. However, $Li_2NiO_2$, which is a commonly used irreversible additive, had an orthorhombic crystal structure and belonged to a space group of Immm. However, the above material has a problem of causing the generation of impurities or gas while undergoing three stages of structural changes in the operating voltage range after the initial charge of the secondary battery.

Specifically, the above material maintains an orthorhombic crystal structure in the range of 3.0 to 3.5V, but depending on the de-intercalation of Li, the crystal structure changes three times to a trigonal system at 3.5 to 4.0 V and to a monoclinic system at 3.5 to 4.25 V. When such material is decomposed, it may cause some problems such as the generation of impurities and the generation of gases.

In particular, the irreversible additive ($Li_2NiO_2$) having an orthorhombic crystal structure leads to unpredictable by-product and extra gas generation when the crystal structure is changed to a trigonal system.

Moreover, since it causes a change in the crystal structure, there also is a problem that the structural stability is deteriorated.

Therefore, there is an urgent need for a technique that solves the above problems and thus, does not cause generation of impurities or gas and has excellent structural stability within the operating voltage range of the secondary battery, even while sufficiently expressing Li ions at the initial charge.

DETAILED DESCRIPTION OF THE PRESENT DISCLOSURE

Technical Problem

The present disclosure has been designed to solve the above-mentioned problems, and therefore, it is an object of the present disclosure to provide an irreversible additive that minimizes generation of impurities or gas and has excellent structural stability in the working voltage range of a secondary battery, even while providing Li ions at the initial charge to reduce irreversibility.

It is another object of the present disclosure to provide a cathode material for a secondary battery including the irreversible additive, and a secondary battery exhibiting excellent electrochemical properties by including the same.

Technical Solution

It should be understood that the terms and wordings used herein should not be construed to be limited to general or lexical means, nor should the concepts of the terms be considered to be defining or describing the present disclosure made by the inventor(s) in the best way. Further, the terms and wordings should be constructed to have meanings and concepts that agree with the technical spirit of the present disclosure.

Through the following disclosure and examples, certain embodiments of an irreversible additive contained in a cathode material for a secondary battery, a cathode material including the irreversible additive, and a secondary battery including the same will be described. These particular described embodiments and examples are for illustration only and the present disclosure should not be considered to be limited to such embodiments and examples herein.

The irreversible additive contained in a cathode material for a secondary battery according to one embodiment of the present disclosure is an oxide represented by the following chemical Formula 1, wherein the oxide has a trigonal crystal structure.

$$Li_{2+a}Ni_{1-b}Mo_bO_{2+c} \quad (1)$$

in Formula 1, $-0.2 \leq a \leq 0.2$, $0 < b \leq 0.2$, $0 \leq c \leq 0.2$.

In this regard, conventionally, the oxide having Formula 1 were prepared by mixing a lithium raw material and a nickel raw material, and then heat-treating the mixture.

When the general raw materials were mixed and heat-treated in this way, the oxide was produced into a material having an orthorhombic crystal structure, which is the most stable form. Therefore, conventionally, an oxide having an orthorhombic crystal structure has been added as the irreversible additive.

However, as a result of repeated in-depth studies, the present inventors have found that the material having the crystal structure as described above is added, impurities or gas are generated within the working voltage range of the secondary battery, and thus there is a problem that the battery performance is rapidly deteriorated as the cycle proceeds, confirmed that the above causes occur as a result of undergoing three stages of crystal structure changes as mentioned above, and found out that when the oxide represented by the chemical Formula 1 is added as a material having a trigonal crystal structure from the beginning, the trigonal and monoclinic crystal structures can be reversibly maintained according to the voltage of the secondary battery within the operating voltage range of the secondary battery.

On the other hand, when the structure changes according to the voltage in the secondary battery, a trigonal crystal structure causes de-intercalation of Li ions. When the molar ratio is 1, it produces $LiNiO_2$ and has the crystal structure.

However, according to the present disclosure, the irreversible additive may have a trigonal crystal structure while Li is an extra litigated oxide with a molar ratio of about twice that of the transition metal, as represented by the chemical formula 1.

Furthermore, the lithium-rich irreversible additive having the trigonal crystal structure does not have an orthorhombic crystal structure which is a stable crystal structure, and subsequently, the crystal structure changes according to the voltage, so that the structural stability is deteriorated.

Thus, as a result of repeated in-depth studies, the present inventors have found that when a part of Ni is doped and substituted with Mo in the irreversible additive, it is possible to enhance the structural stability, thereby further reducing by-products and increasing the stability.

At this time, the Mo may dope or substitute a part of Ni in an amount of more than 0 to 20% or less on a molar basis, and specifically, the oxide may be $Li_2Ni_{0.9}Mo_{0.1}O_2$.

The irreversible additive represented by the chemical Formula 1 may belong to a space group of P3-m1, and more particularly, the crystal lattice of the oxide may be a=3.0954 Å, c=5.0700 Å, γ=120.00°.

The material as above is prepared by a process in which Mo-doped $LiNi_{1-b}Mo_bO_2$ (where $0<b\leq 0.2$) is mixed with $Li^+$benzophenone$^-$ and reacted under THF to obtain a trigonal $Li_2Ni_{1-b}Mo_bO_2$ (where $0<b\leq 0.2$) having weak crystallinity, which is then heat-treated under an inert atmosphere to obtain a trigonal $Li_2Ni_{1-b}Mo_bO_2$ (where $0<b\leq 0.2$) having high crystallinity.

The reaction under THF is specifically performed by a process in which the mixture is stirred, filtered, washed with dry THF, and then dried under vacuum.

The heat treatment is performed at 200 to 400° C. for 10 to 24 hours under an inert atmosphere.

The inert atmosphere may be a helium or argon atmosphere, and the heat treatment is performed while flowing the gases.

Further, the preparation must be performed within the range of temperature and time during the heat treatment, thereby making it possible to improve only the crystallinity without changing the crystal structure of the trigonal $Li_2Ni_{1-b}Mo_bO_2$ (where $0<b\leq 0.2$) formed by reacting under THF. When the temperature is too low or the time is short, the crystallinity is not sufficiently improved, and when the temperature is too high or the time is long, it may give changes in the crystal structure itself, which is not preferable.

The $LiNi_{1-b}Mo_bO_2$ (where $0<b\leq 0.2$) can be prepared by a method of substituting Mo in a conventionally known method for producing $LiNiO_2$.

For example, it is prepared by mixing a lithium raw material and a nickel raw material together with a molybdenum raw material in a molar ratio satisfying the composition ratio and heat-treating the mixture.

The heat treatment is performed at 650 to 800° C. for 12 to 36 hours under an air atmosphere. In the case of wet method, a drying process may be further included.

The preparation must be performed within the range of the temperature and time of the heat treatment, so that the reaction between the lithium raw material and the nickel raw material and further the molybdenum raw material can sufficiently occur, and unreacted materials can be minimized.

As the lithium raw material, lithium-containing oxides, sulfates, nitrates, acetates, carbonates, oxalates, citrates, halides, hydroxides or oxyhydroxides, and the like can be used, and specific examples thereof include $Li_2CO_3$, $LiNO_3$, $LiNO_2$, $LiOH$, $LiOH.H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$. Any one or a mixture of two or more of them may be used.

As the nickel raw material, nickel-containing oxides, sulfates, nitrates, acetates, carbonates, oxalates, citrates, halides, hydroxides or oxyhydroxides, and the like can be used, and specific examples thereof include $NiO$, $Ni(NO_3)_2$, $LiNiO2$, $NiSO_4$, $Ni(OH)_2$, and the like. Any one or a mixture of two or more of them may be used.

The molybdenum raw material may be a molybdenum-containing oxide.

The irreversible additive of the crystal structure as above can provide sufficient Li at the initial charge with an excessive amount of lithium to solve the irreversibility problem and also reduce the stage of change in crystal structure within the operating voltage range, thereby being able to not only minimize incidental problems such as generation of impurities or gas resulting from de-intercalation of an excessive amount of Li ions, but also improve the structural stability to minimize side reactions.

Meanwhile, according to one embodiment of the present disclosure, there is provided a cathode material including the irreversible additive and a cathode active material.

In this case, the content of the irreversible additive may be 0.1% by weight to 10% by weight, more specifically 1% by weight to 5% by weight, and more specifically 1% to 3% by weight based on the total weight of the cathode material.

When the content of the irreversible additive is less than 0.1% by weight outside the above range, the compensation effect of anode efficiency due to the addition of an irreversible additive cannot be obtained, and when the content exceeds 10% by weight, problems such as volume expansion of the electrode due to the generation of impurities or gas, and deterioration of life may occur.

Further, according to one embodiment of the present disclosure, there is provided a secondary battery including a cathode in which a cathode material is coated onto a cathode current collector, wherein the cathode material includes an irreversible additive including an oxide represented by the following chemical Formula 1, and a cathode active material, and the irreversible additive has a trigonal crystal system and is converted into a monoclinic crystal system in a reversible structural conversion manner within a range in which the operating range of the secondary battery is 4.0V or more.

$$Li_{2+a}Ni_{1-b}Mo_bO_{2+c} \qquad (1)$$

in Formula 1, $-0.2 \leq a \leq 0.2$, $0 < b < 0.2$, $0 \leq c \leq 0.2$.

As described above, the crystal structure of the irreversible additive of lithium nickel molybdenum oxide changes in the operating voltage range of the secondary battery, and this is also the same as when the irreversible additive according to the present disclosure is used.

Therefore, according to the present disclosure, even if the oxide represented by the chemical Formula 1 having a trigonal crystal structure is added as an irreversible additive, the crystal structure of the oxide can change to a monoclinic crystal system within the operating voltage range of the secondary battery according to the intercalation and de-intercalation of Li ions.

In other words, the irreversible additive according to the present disclosure can be added to the cathode material in the form of a trigonal crystal structure, and can be reversibly converted into a monoclinic crystal system within the operating voltage range of the secondary battery.

In this case, the oxide having a monoclinic crystal structure may, specifically, belong to a space group of $C_{2/m}$.

On the other hand, the cathode active material contained in the cathode material may be, for example, $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-d}Co_dO_2$, $LiCo_{1-d}MndO_2$, $LiNi_{1-d}Mn_dO_2$ ($0 \leq d < 1$), $Li(Ni_aCo_bMn_c)O_4$ ($0<a<2$, $0<b<2$, $0<c<2$, $a+b+c=2$), $LiMn_{2-e}Ni_eO_4$, $LiMn_{2-e}Co_eO_4$ ($0<e<2$), $LiCoPO_4$, $LiFePO_4$, or the like, and any one or a mixture of two or more of them may be used.

Of these, specifically, the cathode active material may include an oxide represented by the following chemical Formula 2.

$$Li(Ni_aCO_bMn_c)O_2 \qquad (2)$$

in Formula 2, $0<a<1$, $0<b<1$, $0<c<1$, $a+b+c=1$.

The oxide of the chemical Formula 2 is easily changed in the crystal structure from hexagonal to monoclinic while Li ions being intercalated and de-intercalated in the operating voltage range of the secondary battery. Therefore, since the oxide can have a structure similar to that of the irreversible additive of the present disclosure within the operating range, it is more effective in the use of the irreversible additive according to the present disclosure.

More specifically, the oxide represented by the chemical Formula 2 may be contained in an amount of 80% by weight or more based on the total weight of the cathode active material.

The cathode material may further include a conductive material, a binder, a filler and the like, in addition to the cathode active material and the irreversible additive.

The conductive material is used to impart conductivity to the electrode, and in the battery to be configured, the conductive material can be used without particular limitation as long as it does not cause chemical changes and has electronic conductivity. Specific examples include carbon-based materials such as carbon black, acetylene black, ketjen black, channel black, furnace black, lamp black, thermal black and carbon fiber; graphite such as natural graphite and artificial graphite; metal powder or metal fibers such as copper, nickel, aluminum and silver; conductive whiskey such as zinc oxide and potassium titanate; conductive metal oxides such as titanium oxide; or a conductive polymer such as a polyphenylene derivative. Any one alone or a mixture of two or more of them may be used. The conductive material may be included in an amount of 1% to 30% by weight based on the total weight of the cathode material.

The binder plays a role of improving adhesion between the cathode active material particles and adhesive strength between the cathode active material and the current collector. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, recycled cellulose, polyvinylpyrrolidone, tetrafluoroethylene, polyethylene, polypropylene, ethylene-propylene-diene polymer (EPDM), sulfonated-EPDM, styrene butadiene rubber (SBR), fluororubber, or various copolymers thereof, and any one alone or a mixture of two or more of them may be used. The binder may be included in an amount of 1% to 30% by weight based on the total weight of the cathode material.

The cathode current collector is not particularly limited as long as it has conductivity while not causing chemical changes to the battery, and for example, stainless steel, aluminum, nickel, titanium, calcined carbon, or aluminum or stainless steel having a surface treated with carbon, nickel, titanium, silver, etc. may be used. In addition, the cathode current collector may have a thickness of 3 µm to 500 µm, and may have fine irregularities formed on the surface thereof to increase the adhesion of the cathode active material. For example, it may be used in various forms such as films, sheets, foils, nets, porous bodies, foams, and nonwoven fabrics.

The secondary battery may have a structure in which an electrode assembly is built in a battery case together with an electrolyte, with the electrode assembly including:

the cathode;

an anode in which an anode material including an anode active material is coated onto an anode current collector; and a separator that is interposed between the cathode and the anode.

Specifically, the secondary battery may be a lithium secondary battery.

The anode may also be manufactured in a form in which an anode material including an anode active material is coated onto an anode current collector, and the anode material may further include a conductive material and a binder as described above, together with an anode active material.

As the anode active material, a compound capable of reversibly intercalating and deintercalating lithium may be used. Specific examples thereof may include carbonaceous materials such as artificial graphite, natural graphite, graphitized carbon fibers and amorphous carbon; metallic compounds capable of alloying with lithium, such as Si, Al, Sn, Pb, Zn, Bi, In, Mg, Ga, Cd, Si alloy, Sn alloy or Al alloy; metal oxides capable of doping and undoping lithium, such as $SiO_x$ (0<x<2), $SnO_2$, vanadium oxide and lithium vanadium oxide; or a composite including the above metallic compound and the carbonaceous material such as a Si—C composite or a Sn—C composite, or the like, and any one or a mixture of two or more of them may be used. In addition, a metal lithium thin film may be used as the anode active material. Further, both low crystalline carbon and high crystalline carbon may be used as the carbon material. Typical examples of the low crystalline carbon may be soft carbon and hard carbon. Typical examples of the high crystalline carbon may be amorphous, planar, flaky, spherical or fibrous natural or artificial graphite, Kish graphite, pyrolytic carbon, mesophase pitch based carbon fiber, mesocarbon microbeads, mesophase pitches, and high-temperature calcined carbon such as petroleum or coal tar pitch derived cokes.

The anode current collector is not particularly limited as long as it has high conductivity without causing chemical changes to the battery. For example, copper, stainless steel, aluminum, nickel, titanium, calcined carbon, copper or stainless steel having a surface treated with carbon, nickel, titanium, silver, etc., aluminum-cadmium alloy, and the like may be used. In addition, the anode current collector may generally have a thickness of 3 μm to 500 μm, and, like the cathode current collector, may have fine irregularities formed on the surface thereof to enhance the bonding strength of the anode active material. For example, it may be used in various forms such as films, sheets, foils, nets, porous bodies, foams and nonwoven fabrics.

The separator separates the anode and the cathode, and provides a passage for lithium ions to move. Any separator may be used without particular limitation as long as it is generally used as a separator in a lithium secondary battery. Particularly, a separator having excellent moisture-retention ability for an electrolyte while having low resistance to the migration of electrolyte ions is preferable. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure having two or more layers thereof may be used. In addition, a conventional porous nonwoven fabric, for example, a nonwoven fabric made of high melting point glass fiber, polyethylene terephthalate fiber, or the like may also be used. In addition, in order to secure heat resistance or mechanical strength, a coated separator containing a ceramic component or a polymer material may be used, and optionally, a single layer or a multilayer structure may be used.

In addition, the electrolyte used in the present disclosure may include, but is not limited to, an organic liquid electrolyte, an inorganic liquid electrolyte, a solid polymer electrolyte, a gel polymer electrolyte, a solid inorganic electrolyte, a molten inorganic electrolyte or the like which can be used in the preparation of a lithium secondary battery.

Specifically, the electrolyte may include an organic solvent and a lithium salt.

As the organic solvent, any solvent may be used without particular limitation as long as it can serve as a medium through which ions involved in the electrochemical reaction of the battery can move. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol or isopropyl alcohol; nitriles such as R—CN (R is a straight, branched or cyclic C2-C20 hydrocarbon group, and may include a double-bond aromatic ring or ether bond); amides such as dimethylformamide; dioxolanes such as 1,3-dioxolane; or sulfolanes may be used. Among them, the carbonate-based solvent is preferable, and a mixture of a cyclic carbonate (e.g., ethylene carbonate, propylene carbonate, etc.) having high ionic conductivity and a high-dielectric constant, which may increase charge/discharge performance of the battery, and a low-viscosity linear carbonate-based compound (e.g., ethyl methyl carbonate, dimethyl carbonate, diethyl carbonate, etc.) may be more preferably used. In this case, when the cyclic carbonate and the chain carbonate are mixed and used in a volume ratio of about 1:1 to about 1:9, the electrolyte may exhibit excellent performance.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. It is preferable to use the lithium salt in a concentration rage of 0.1 to 2.0 M. If the concentration of the lithium salt is within the above range, since the electrolyte has an appropriate conductivity and viscosity, excellent electrolyte performance can be exhibited, and lithium ions can effectively move.

In order to improve the lifespan characteristics of the battery, suppress a reduction in battery capacity and improve discharge capacity of the battery, for example, one or more additives such as a halo-alkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinones, N,N-substituted imidazolidine, ethylene glycol dialkyl ether, an ammonium salt, pyrrole, 2-methoxy ethanol, or aluminum trichloride may be further added to the electrolyte in addition to the above electrolyte components. In this case, the additive may be included in an amount of 0.1% to 5% by weight based on the total weight of the electrolyte.

The lithium secondary battery according to the present disclosure as described above may be used as a power source of devices in portable devices such as mobile phones, notebook computers, digital cameras, and electric vehicles such as hybrid electric vehicles (HEVs).

BRIEF DESCRIPTION OF THE DRAWINGS

FIG. 1 is a graph showing the XRD measurement results of Comparative Example 1 according to Experimental Example 1;

FIG. 2 is a graph showing the XRD measurement results of Comparative Example 2 according to Experimental Example 1; and FIG. 3 is a graph showing the XRD measurement results of Example 1 according to Experimental Example 1.

DETAILED DESCRIPTION OF THE EMBODIMENTS

Hereinafter, various embodiments of the present disclosure will be described in detail with reference to the accompanying figures so that those skilled in the art can easily implement them. The present disclosure may be modified in various different ways, and is not limited to the embodiments set forth herein.

Comparative Example 1

22.9 g of $Li_2O$ and 30 g of NiO (molar ratio 1:1) were mixed, and then heat-treated at 685 degrees Celsius for 18 hours under an $N_2$ atmosphere, and then the resulting reaction product was cooled to obtain irreversible additive particles $Li_2NiO_2$.

Comparative Example 2

$LiNiO_2$ and more than 1.5M $Li^+$benzophenone$^-$ were reacted in the presence of THF (tetrahydrofuran) under an inert atmosphere.

Specifically, the mixture of the above materials was stirred for one day, and the mixed powders were filtered. The obtained mixed powder was washed with dry THF and dried under vacuum to obtain a pre-powder in which a small amount of trigonal $Li_2NiO_2$ and $LiNiO_2$ were mixed.

Subsequently, the pre-powder was heat-treated at 225° C. for 14 hours under dry helium flow to obtain a $Li_2NiO_2$ powder having a trigonal crystal structure with improved crystallinity.

Example 1

14.04 g of $Li_2O$, 67.22 g of NiO and 14.39 g of $MoO_3$ were mixed, and then heat-treated at 685 degrees Celsius for 18 hours under an $N_2$ atmosphere, and then the resulting reaction product was cooled to obtain irreversible additive particles $LiNi_{0.9}Mo_{0.1}O_2$.

$LiNi_{0.9}Mo_{0.1}O_2$ and more than 1.5M $Li^+$benzophenone$^-$ were reacted in the presence of THF (tetrahydrofuran) under an inert atmosphere.

Specifically, the mixture of the above materials was stirred for one day, and the mixed powders were filtered. The obtained mixed powder was washed with dry THF and dried under vacuum to obtain a pre-powder in which a small amount of trigonal $Li_2Ni_{0.9}Mo_{0.1}O_2$ and, Li $Ni_{0.9}Mo_{0.1}O_2$ were mixed.

Subsequently, the pre-powder was heat-treated at 225° C. for 14 hours under dry helium flow to obtain a $Li_2Ni_{0.9}Mo_{0.1}O_2$ powder having a trigonal crystal structure with improved crystallinity.

Experimental Example 1

2 g of the irreversible additive particles prepared in Comparative Examples 1 and 2 and Example 1 were each collected as samples, and subjected to XRD analysis. The results are shown in FIGS. 1 to 3.

XRD analysis was measured with a Bruker XRD D4 instrument, and experiment was performed from 10 degrees to 80 degrees in 0.02 steps using a Cu source target.

Referring to FIGS. 1 to 3, it can be seen that the irreversible additives having a different structure according to Comparative Examples 1 and 2 and Example 1 were formed.

Specifically, it can be seen that Comparative Example 1 is formed with an orthorhombic type crystal structure, and Example 1 is formed with a trigonal crystal structure.

Comparative Example 3 and Example 2

Using the irreversible additives prepared in Comparative Example 2 and Example 1, a cathode and a lithium secondary battery were manufactured by the following method.

Specifically, the irreversible additive prepared in Comparative Example 2 and Example 1, $LiNi_{0.4}Mn_{0.3}Co_{0.3}O_2$ as a cathode active material, a carbon black conductive material and a PVdF binder were mixed in a weight ratio of 4.6:87.9:3.5:4 in an N-methylpyrrolidone solvent to prepare a cathode slurry. The slurry was coated onto an aluminum current collector, and dried and rolled to prepare a cathode.

In addition, MCMB (mesocarbon microbead), which is an artificial graphite mixed with 10 wt. % of SiO as an anode active material, a carbon black conductive material and PVdF binder were mixed in a weight ratio of 90:5:5 in an N-methylpyrrolidone solvent to prepare a composition for forming an anode, which was coated onto a copper current collector to prepare an anode.

A porous polyethylene separator was interposed between the cathode and the anode prepared as described above to manufacture an electrode assembly. The electrode assembly was placed inside the case, and then an electrolyte was injected into a case to manufacture a lithium secondary battery. At this time, the electrolyte was prepared by dissolving 1.15M lithium hexafluorophosphate ($LiPF_6$) in an organic solvent consisting of ethylene carbonate/dimethyl carbonate/ethylmethyl carbonate (EC/DMC/EMC mixing volume ratio=3/4/3).

Experimental Example 2

2 g of the irreversible additive particles prepared in Comparative Example 2 and Example 1 were each collected as samples, and their oxygen formation energies were measured. The results are shown in Table 1 below.

Specifically, the calculation of oxygen formation energy was performed based on the calculated value for DFT (density functional theory), PBE functional PAW_PBE pseudopotential, cut-off energy=520 eV, calculation model: supercell with $Li_{48}Ni_{24}O_{48}$ atoms-doping/substituting one Ni with Mo (ratio~4.17 at %), oxygen vacancy (VO) production concentration=1/48 (~2.1 at. %) $O_2$ gas (O-rich environment).

TABLE 1

|  | Oxygen ($V_0$) formation energy (eV) |
|---|---|
| Comparative Example 2 | 4.21 |
| Example 1 | 4.54 |

Referring to Table 1, considering that the energy of the trigonal type irreversible additive of Example 1 is higher than that of the trigonal system of Comparative Example 2, it is presumed that the structure change in the intercalation of Li ions during charging and discharging is more robust than the trigonal system without doping or substitution.

Therefore, it is expected that no side reactions will occur compared to the trigonal irreversible additives without doping and substitution.

Experimental Example 3

2 g of the irreversible additive particles prepared in Comparative Example 2 and Example 1 were each collected as samples, and the average lithium de-intercalation voltage from P-3m1 to R-3m was measured, and the results are shown in Table 1 below.

Specifically, in the calculation of the average lithium de-intercalation voltage, the calculation model was prepared using DFT (density functional theory) calculation, PBE functional PAW_PBE pseudopotential, Hubbard U terms: Ni(6.20 eV)/Mo(4.38 ev), cut-off energy=520 eV, calculation model: 4×4×1 hexagonal supercell with $Li_{96}(Ni)_{48}O_{96}$ atoms—doping/substituting one Ni with Mo (ratio~2.08 at %), and the lithium electrode as the counter electrode. While charging them, the average voltage when Li was de-intercalated from P-3m1 to R-3m in the irreversible additive was calculated.

TABLE 2

|  | Average voltage (V vs. Li) |
|---|---|
| Comparative Example 2 | 2.67 |
| Example 1 | 2.54 |

Referring to Table 2, it can be seen that in the case of the trigonal irreversible additive of Example 1, lithium de-intercalation can be easily made at a lower voltage, as compared with the trigonal system of Comparative Example 2. From this, it can be seen that the irreversible additive according to the present disclosure is more useful for Li ion compensation.

INDUSTRIAL APPLICABILITY

As the irreversible additive according to the present disclosure has a trigonal crystal structure as the oxide represented by the chemical formula 1, impurities and gas generation problems associated with the de-intercalation of excess Li ions can be significantly reduced, and the structural stability can be further improved due to the doping of Mo. Therefore, a lithium secondary battery manufactured using a cathode material including the same can effectively compensate for irreversibility and exhibit more excellent electrochemical properties and lifespan characteristics.

The invention claimed is:

1. An irreversible additive contained in a cathode material for a secondary battery, the irreversible additive comprising an oxide having a trigonal crystal structure and represented by the following chemical Formula 1:

$$Li_{2+a}Ni_{1-b}MO_bO_{2+c} \quad (1)$$

in Formula 1, $-0.2 \leq a \leq 0.2$, $0 < b \leq 0.2$, $0 \leq c \leq 0.2$.

2. The irreversible additive according to claim 1, wherein the oxide belongs to a space group of P3-m1.

3. The irreversible additive according to claim 1, wherein the oxide has a crystal lattice of a=3.0954 Å, c=5.0700 Å and γ=120.00°.

4. The irreversible additive according to claim 1, wherein the oxide is $Li_2Ni_{0.9}Mo_{0.1}O_2$.

5. A cathode material comprising the irreversible additive of claim 1 and a cathode active material.

6. The cathode material according to claim 5, wherein a content of the irreversible additive is 0.1% by weight to 10% by weight based on the total weight of the cathode material.

7. A secondary battery comprising a cathode in which a cathode material is coated onto a cathode current collector, the cathode material including the irreversible additive of claim 1,
wherein the irreversible additive has a trigonal system capable of converting into a monoclinic system within a secondary battery operating range of the 4.0V or more.

8. The secondary battery according to claim 7, wherein the irreversible additive belongs to a space group of C2/m when the crystal structure is a monoclinic crystal system.

9. The secondary battery according to claim 7, wherein the cathode active material comprises a cathode active material including an oxide represented by the following Chemical Formula 2:

$$Li(Ni_aCo_bMn_c)O_2 \quad (2)$$

in the above formula, $0<a<1$, $0<b<1$, $0<c<1$, $a+b+c=1$.

10. The secondary battery according to claim 7, wherein the secondary battery has a structure in which an electrode assembly is built in a battery case together with an electrolyte, wherein the electrode assembly comprising:
the cathode;
an anode in which an anode material including an anode active material is coated onto an anode current collector; and
a separator that is interposed between the cathode and the anode.

11. The secondary battery according to claim 7, wherein the secondary battery is a lithium secondary battery.

* * * * *